United States Patent
Lee et al.

(10) Patent No.: US 8,953,110 B2
(45) Date of Patent: Feb. 10, 2015

(54) LIQUID CRYSTAL DISPLAY AND METHOD FOR FABRICATING THE SAME

(75) Inventors: Seok-Woo Lee, Gyeonggi-do (KR); Young-Joo Kim, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 1155 days.

(21) Appl. No.: 12/652,819

(22) Filed: Jan. 6, 2010

(65) Prior Publication Data

US 2010/0103338 A1    Apr. 29, 2010

Related U.S. Application Data

(62) Division of application No. 11/643,876, filed on Dec. 22, 2006, now Pat. No. 7,652,727.

(30) Foreign Application Priority Data

Jun. 30, 2006 (KR) .................. 61663/2006
Nov. 30, 2006 (KR) .................. 120219/2006

(51) Int. Cl.
*G02F 1/1368* (2006.01)
*G02F 1/1362* (2006.01)
*G02F 1/1345* (2006.01)

(52) U.S. Cl.
CPC *G02F 1/136213* (2013.01); *G02F 2001/13685* (2013.01); *G02F 1/13454* (2013.01); *G02F 1/1368* (2013.01); *G02F 2202/104* (2013.01)
USPC .......................................................... 349/39

(58) Field of Classification Search
None
See application file for complete search history.

(56) References Cited

U.S. PATENT DOCUMENTS

| | | | | |
|---|---|---|---|---|
| 5,182,620 A | * | 1/1993 | Shimada et al. | 257/72 |
| 5,585,647 A | * | 12/1996 | Nakajima et al. | 257/72 |
| 6,037,195 A | * | 3/2000 | Toriyama et al. | 438/149 |
| 6,133,967 A | * | 10/2000 | Moon | 349/39 |
| 6,225,150 B1 | * | 5/2001 | Lee et al. | 438/153 |
| 6,317,173 B1 | * | 11/2001 | Jung et al. | 349/42 |
| 6,344,888 B2 | * | 2/2002 | Yasukawa | 349/113 |
| 6,515,336 B1 | * | 2/2003 | Suzawa et al. | 257/350 |
| 6,657,230 B1 | * | 12/2003 | Murade | 257/72 |
| 6,697,136 B1 | * | 2/2004 | Yasukawa | 349/113 |
| 6,864,134 B1 | * | 3/2005 | Satou et al. | 438/197 |
| 7,317,209 B2 | * | 1/2008 | Kurosawa et al. | 257/72 |
| 2001/0052950 A1 | * | 12/2001 | Yamazaki et al. | 349/43 |
| 2002/0018152 A1 | | 2/2002 | Nagata et al. | |
| 2004/0029388 A1 | | 2/2004 | Verhaverbeke et al. | |
| 2004/0174483 A1 | | 9/2004 | Nakamura et al. | |
| 2006/0061701 A1 | | 3/2006 | Chang | |

(Continued)

FOREIGN PATENT DOCUMENTS

CN    1752830 A    3/2006
EP    1 058 311 A2    12/2000

(Continued)

OTHER PUBLICATIONS

German Patent and Trademark Office—Examination Report for German Patent Application No. 10 2006 060 734.1 dated Dec. 14, 2012—Including English Translation.

*Primary Examiner* — Mike Stahl
(74) *Attorney, Agent, or Firm* — Morgan, Lewis & Bockius LLP

(57) ABSTRACT

A liquid crystal display includes an insulating substrate having a pixel portion divided into a thin film transistor region and a storage region, a first active layer formed on the substrate to cover at least the thin film transistor region, and a storage electrode formed on the first active layer to selectively cover the storage region.

10 Claims, 12 Drawing Sheets

(56) References Cited

U.S. PATENT DOCUMENTS

| | | | |
|---|---|---|---|
| 2006/0097261 A1* | 5/2006 | Yang | 257/66 |
| 2006/0145162 A1* | 7/2006 | Yang | 257/72 |
| 2007/0103610 A1 | 5/2007 | Lee et al. | |
| 2008/0265254 A1* | 10/2008 | Nishiura | 257/59 |

FOREIGN PATENT DOCUMENTS

| | | |
|---|---|---|
| JP | 4-415 | 1/1992 |
| JP | 7-92500 | 4/1995 |
| JP | 9-160074 | 6/1997 |
| JP | 9-260672 | 10/1997 |
| JP | 10-142636 | 5/1998 |
| JP | 11-271812 | 10/1999 |
| JP | 2000-206566 | 7/2000 |
| JP | 2000-353811 A | 12/2000 |
| JP | 2001-21920 | 1/2001 |

* cited by examiner

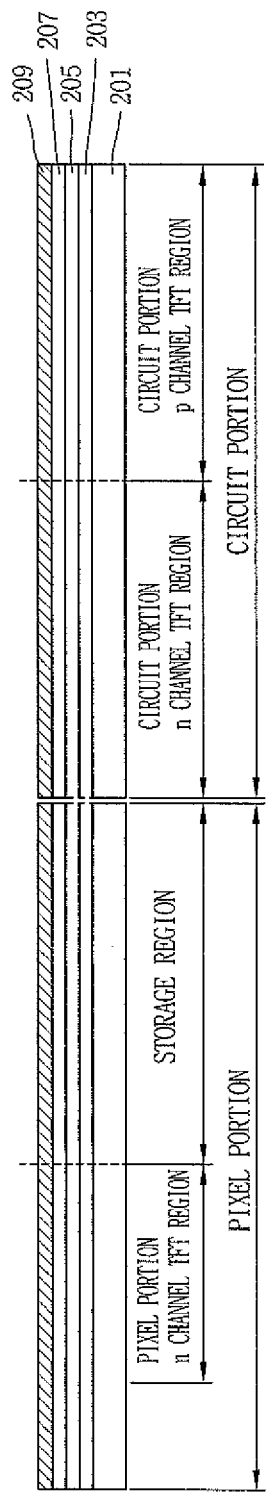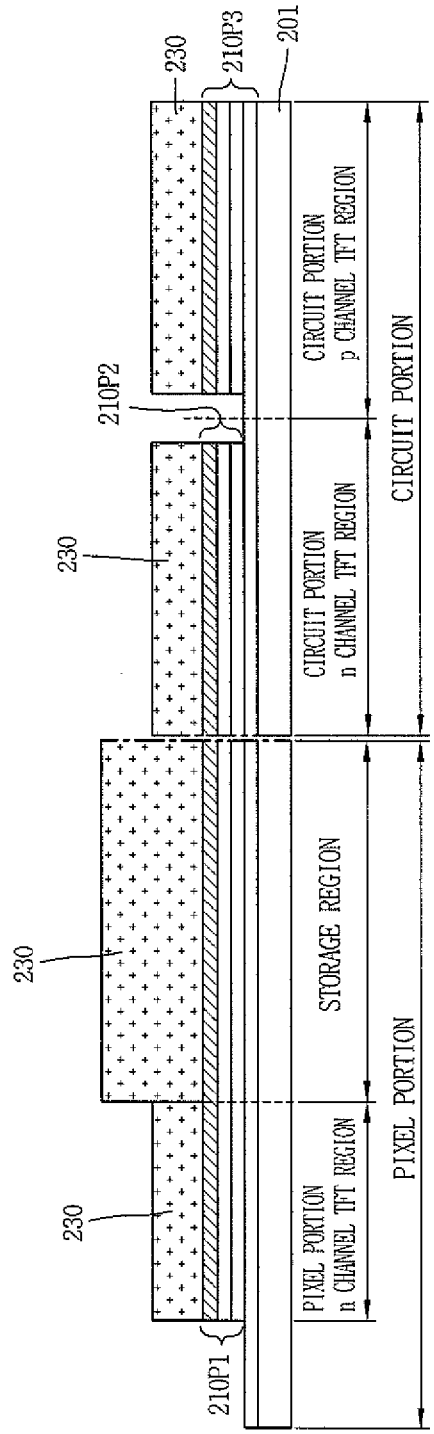

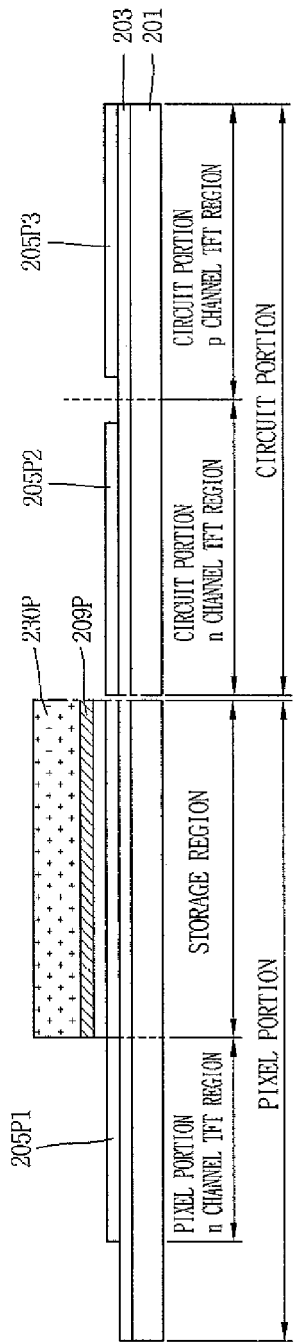
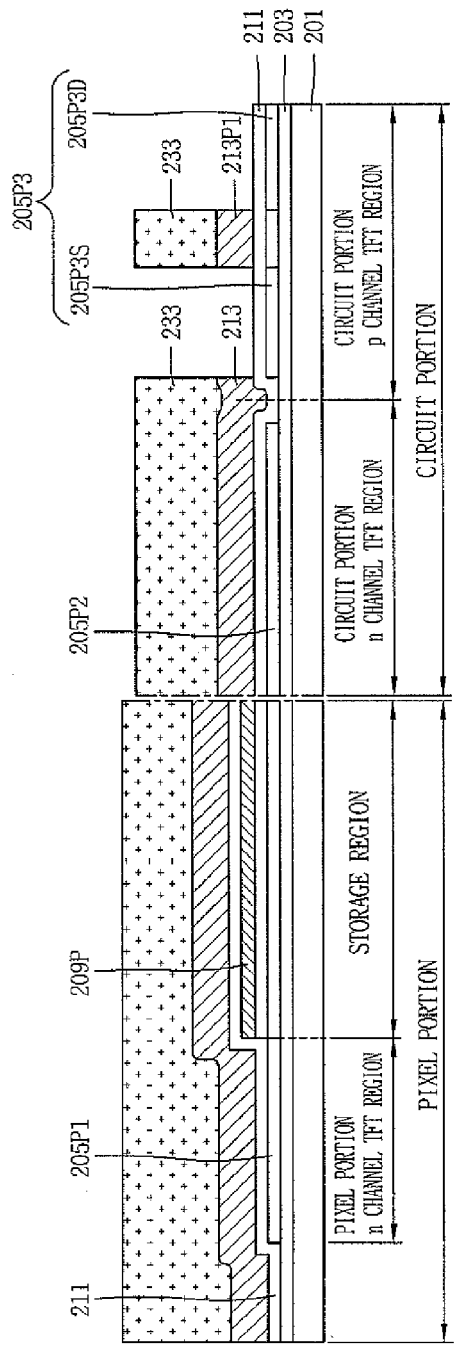

LIQUID CRYSTAL DISPLAY AND METHOD FOR FABRICATING THE SAME

This is a divisional application of application Ser. No. 11/643,876, filed on Dec. 22, 2006 now U.S. Pat. No. 7,652,727, which is hereby incorporated by reference. This application claims the benefit of the Korean Patent Application Nos. 10-2006-0061663, filed on Jun. 30, 2006 and 10-120219, filed Nov. 30, 2006, both which are incorporated by reference in its entirety.

BACKGROUND OF THE INVENTION

1. Field of the Invention

The present invention relates to a liquid crystal display and a method for fabricating the same, and more particularly, to a liquid crystal display with a simplified fabrication process having reduced number of masks and with enhanced yield and luminance due to enhanced aperture ratio and a method thereof.

2. Discussion of the Related Art

Recently, displays are becoming increasingly important as visual information transmission mediums. The key to developing the displays depends on low power consumption, a thin profile, light weight, and superior picture quality. A liquid crystal display (LCD), which is one of the major product types within the flat panel display (FPD) market, not only satisfies these needs but also enables mass production. As a result, the LCD device is replacing the cathode ray tube (CRT).

The liquid crystal display (LCD) device displays an image by supplying data signals according to image information to liquid crystal cells arranged in a matrix form thereby controlling light transmittance of the liquid crystal cells. The LCD mainly employs an active matrix driving mode in which an amorphous silicon thin film transistor (a-Si TFT) is used as a switching element to drive liquid crystals of a pixel portion.

However, a field effect mobility (~1 $cm^2$/Vsec) of the amorphous silicon thin film transistor imposes a limitation for use in peripheral circuits requiring a high speed operation greater than 1 MHz. Accordingly, research for simultaneously forming a pixel portion and a driving circuit portion on a glass substrate using polycrystalline silicon (poly-Si) having a field effect mobility greater than that of amorphous silicon thin film transistor is being actively performed.

The polycrystalline silicon thin film transistor has been applied to a small sized module, such as a camcorder, since a liquid crystal color television has been developed in 1982. Since the polycrystalline silicon thin film transistor has a low photosensitivity and a high field effect mobility, there are several advantages including the driving circuit being able to be directly fabricated on a substrate.

Increased mobility can increase the operation frequency of the driving circuit portion, which determines the number of driving pixels, thereby enhancing the fineness of a display device. In addition, increased mobility can decrease the charging time of the signal voltage in the pixel portion. Accordingly, the distortion of a transmitting signal can be reduced and the picture quality can be enhanced. The amorphous silicon thin film transistor has a high driving voltage of 25V, whereas the polycrystalline silicon thin film transistor has a relatively low driving voltage of 10V. Therefore, the power consumption can be decreased using a polycrystalline silicon thin film transistor.

FIG. 1 is a plane view showing a structure of a driving circuit integrated LCD device in which a driving circuit portion is integrated on an array substrate according to the related art. As shown in FIG. 1, the LCD device comprises a color filter substrate 5, an array substrate 10, and a liquid crystal layer (not shown) formed between the color filter substrate 5 and the array substrate 10.

The array substrate 10 includes a pixel portion 35 forming unit pixels that are arranged in a matrix form, and a driving circuit portion 30 including a data driving circuit 31 and a gate driving circuit 32 that are arranged at an outer periphery of the pixel portion 35. Although not shown, the pixel portion 35 of the array substrate 10 includes a plurality of gate lines and data lines arranged horizontally and vertically on the array substrate 10 to define a plurality of pixel portions. A thin film transistor (TFT) is formed at each intersection between the gate lines and the data lines and, a pixel electrode is formed at the pixel portion. Here, the TFT is a switching device that applies a voltage to the pixel electrode using a field effect transistor (FET). According to the voltages applied to the gate lines and data lines, the TFT controls a current flow through the FET by an electric field.

The driving circuit portion 30 of the array substrate 10 is positioned at an outer periphery of the pixel portion 35, as the array substrate 10 is more protruded than the color filter substrate 5. The data driving circuit portion 31 is positioned at a longer side of the array substrate 10, and the gate driving circuit portion 32 is positioned at a shorter side of the array substrate 10. The data driving circuit portion 31 and the gate driving circuit portion 32 both use TFTs having a complementary metal oxide semiconductor (CMOS) structure to serve as an inverter to properly output an input signal. The CMOS is an integrated circuit having an MOS structure used at a driving circuit portion TFT that requires a high speed signal processing, and CMOS includes both an n-channel TFT and a p-channel TFT. The speed and density characteristics of a CMOS corresponds to that of an intermediate level of an NMOS and a PMOS.

The gate driving circuit portion 32 and the data driving circuit portion 31 supply a scan signal and a data signal to the pixel electrode through the gate line and the data line, respectively, wherein the gate lines and the data lines are connected to an external signal input port (not shown). The gate driving circuit portion 32 and the data driving circuit portion 31 control an external signal input that comes through the external signal input port and output them to respective pixel electrodes.

A color filter (not shown) for producing colors and a common electrode (not shown) facing the pixel electrode formed at the array substrate 10 are formed at the pixel portion 35 of the color filter substrate 5. The color filter substrate 5 and the array substrate 10 are provided with a cell gap to be separated from each other by a spacer (not shown), and are attached to each other by a seal pattern (not shown) formed at an outer periphery of the pixel portion 35 to form a unit LCD panel. The color filter substrate 5 and the array substrate 10 are attached to each other by a bonding key formed on the color filter substrate 5 or on the array substrate 10.

Since the driving circuit integrated LCD device uses a polycrystalline silicon TFT, excellent device characteristics, such as high picture quality, enhanced fineness, and low power consumption, can be obtained. However, the driving circuit integrated LCD device having an re-channel TFT and a p-channel TFT on the same substrate requires more complicated fabrication processes than an amorphous silicon TFT LCD having only a single type channel. In other words, to fabricate the array substrate including the polycrystalline silicon TFT, a large number of photolithography processes are required.

The photolithography processes form desired patterns on a substrate by transferring a pattern from a mask to the substrate. The photolithography processes include a plurality of processes, such as a photoresist depositing process, an exposing process, and a developing process. Accordingly, the photolithography process degrades the production yield, and thus creates a high probability of defects in the TFT. In particular, since a mask designed to form a pattern is very expensive, the fabrication cost for an LCD device increases when the number of masks increases.

SUMMARY OF THE INVENTION

Accordingly, the present invention is directed to a liquid crystal display and a method for fabricating the same that substantially obviates one or more problems due to limitations and disadvantages of the related art.

An object of the present invention is to provide a simplified fabricating process with less number of masks in fabricating a liquid crystal display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display includes an insulating substrate having a pixel portion divided into a thin film transistor region and a storage region, a first active layer formed on the substrate to cover at least the thin film transistor region, and a storage electrode formed on the first active layer to selectively cover the storage region.

In another aspect, the liquid crystal display includes an insulating substrate having a pixel portion and a circuit portion, the pixel portion being divided into a thin film transistor region and a storage region, and the circuit portion being divided into an n-channel thin film transistor region and a p-channel thin film transistor region, a first active layer covering the thin film transistor region of the pixel region, a second active layer covering the n-channel thin film transistor region, and a third active layer covering the p-channel thin film transistor region, the first, second, and third active layers being formed on the insulating substrate at the same level; and a storage electrode on the substrate having the third active layer to cover the storage region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5A to 5G are sectional views taken along line III-III' of FIG. 4, illustrating process steps of a method for fabricating an LCD according to the second exemplary embodiment of the present invention.

DETAILED DESCRIPTION OF THE PREFERRED EMBODIMENTS

Reference will now be made in detail to the preferred embodiments of the present invention, examples of which are illustrated in the accompanying drawings. Hereinafter, a liquid crystal display (LCD) and a method for fabricating the same according to the present invention will be explained.

Figure 1:
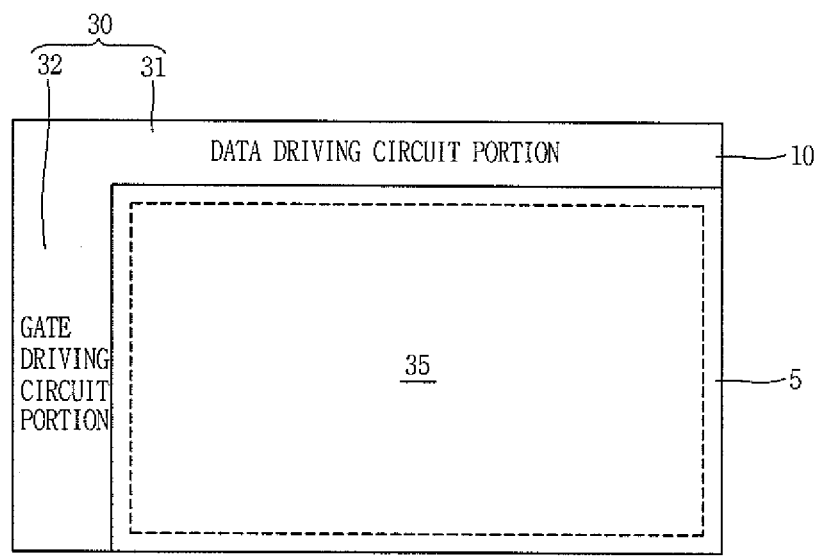
FIG. 1 is a plane view schematically showing a structure of a driving circuit integrated LCD device in accordance with the related art.
Figure 2:
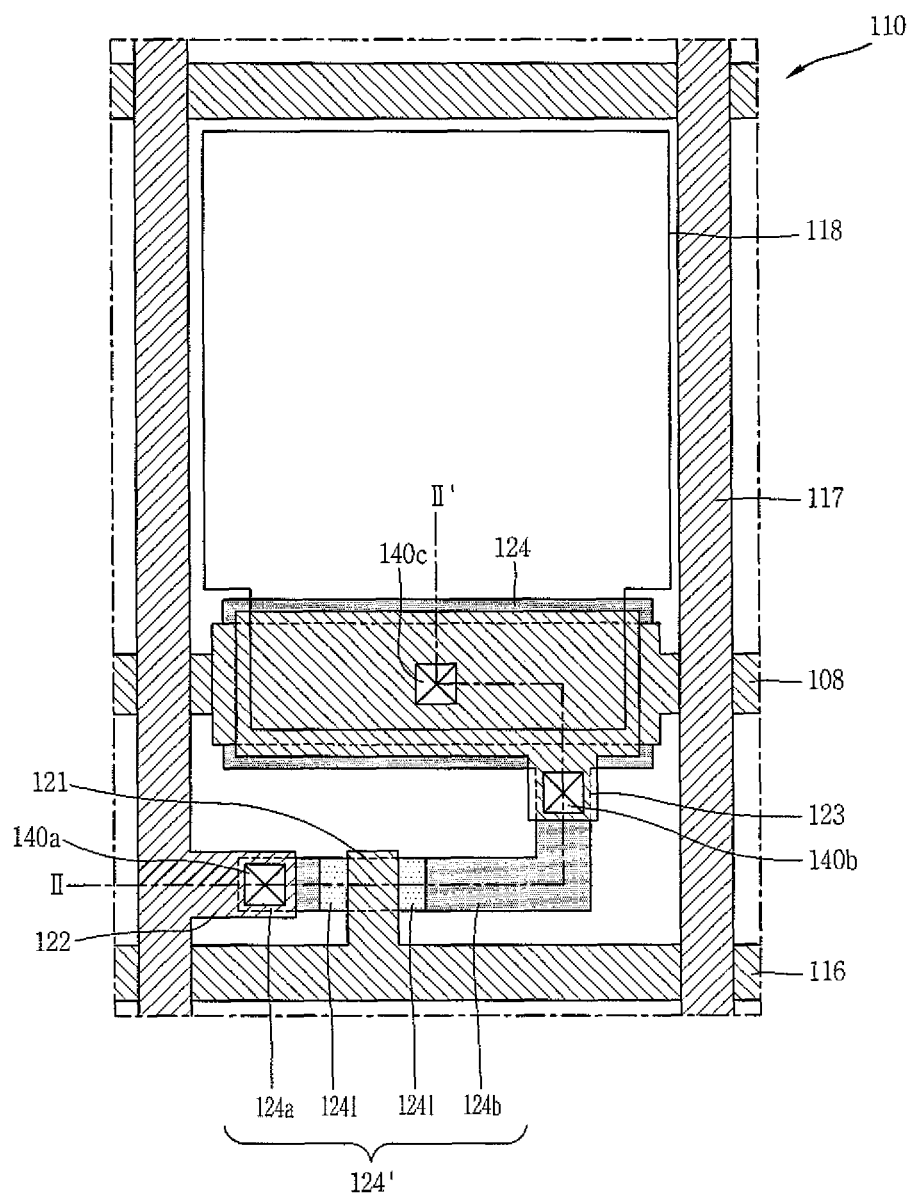
FIG. 2 is a plane view illustrating a part of an array substrate of an LCD according to the first exemplary embodiment of the present invention.

FIG. 2 is a plane view schematically showing an array substrate of an LCD device according to a first exemplary embodiment of the present invention showing one pixel including a thin film transistor (TFT) of a pixel portion. In the LCD device, N gate lines and M data lines are crossing one another, thereby constructing M×N pixels. However, only one pixel is shown in FIG. 2 for convenience.

As shown in FIG. 2, an array substrate 110 of an LCD device according to the first embodiment of the present invention comprises a gate line 116 and a data line 117, defining a pixel portion by being arranged horizontally and vertically on the array substrate 110. A TFT is formed at each intersection region between the gate line 116 and the data line 117 to function as a switching device. A pixel electrode 118 is formed at each pixel portion and is connected to the TFT for driving a liquid crystal (not shown) together with the common electrode of a color filter substrate (not shown).

The TFT includes a gate electrode 121 connected to the gate line 116, a source electrode 122 connected to the data line 117, and a drain electrode 123 connected to the pixel electrode 118. In addition, the TFT includes an active pattern 124' for forming a conductive channel between the source electrode 122 and the drain electrode 123 by a gate voltage supplied to the gate electrode 121.

Herein, the active pattern 124' of the first exemplary embodiment is formed of a polycrystalline silicon thin film. The active pattern 124' extends toward the pixel portion and is connected to a storage pattern 124", which constitutes a first storage capacitor together with a common line 108. In other words, the common line 108 is formed in substantially the same direction as the gate line 116 in the pixel portion, and the common line 108 overlaps with the storage pattern 124" therebelow with a first insulating film (not shown) being interposed therebetween to constitute the first storage capacitor. The storage pattern 124" is formed by doping the polycrystalline silicon thin film through an additional mask process.

The source electrode 122 and the drain electrode 123 are electrically connected to a source region and a drain region of the active pattern 124' through a first contact hole 140a and a second contact hole 140b formed on the first insulating film and the second insulating film (not shown), respectively. A part of the source electrode 122 extends in one direction constituting the data line 117. In addition, a part of the drain electrode 123 extends towards the pixel portion and is electrically connected to the pixel electrode 118 through a third contact hole 140c formed at a third insulating film (not shown). A part of the drain electrode 123 extending towards the pixel portion and overlaps with the common line 108 formed therebelow with the second insulating film being interposed therebetween, thereby constituting a second storage capacitor.

Hereinafter, fabricating process steps of the aforementioned array substrate will be explained with reference to FIGS. 3A to 3I. FIGS. 3A to 3I are sectional views sequentially showing fabrication processes taken along line II-II' of the array substrate of FIG. 2, which shows processes for fabricating an array substrate of a pixel portion where an n-channel TFT is formed. While the region where a p-channel TFT is formed is not shown in FIGS. 3A to 3I, both an n-channel TFT and a p-channel TFT are formed at the pixel portion.

Figure 3A:
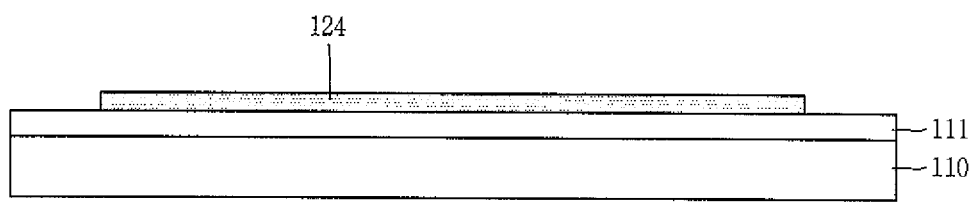
FIGS. 3A to 3I are sectional views illustrating sequential fabricating process steps along line II-II' of the array substrate shown in FIG. 2.

As shown in FIG. 3A, a buffer layer 111 and an amorphous silicon thin film are formed on a substrate 110 formed of a transparent insulating material, such as glass. Then, the amorphous silicon thin film is crystallized to form a polycrystalline silicon thin film. At this time, the substrate 110 is defined by a pixel portion and a circuit portion (not shown), wherein the pixel portion is divided into an n channel TFT region and a storage region, and the circuit portion is divided into an n channel TFT region and a p channel TFT region. Then, the polycrystalline thin film is patterned by using a photolithography process (a first mask process), thereby forming a polycrystalline silicon thin film 124 to constitute an active pattern 124' and a storage pattern 124".

Figure 3B:
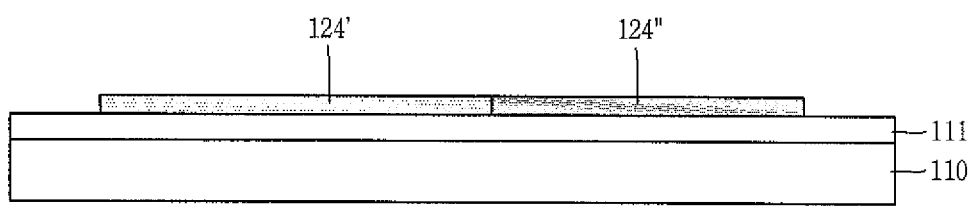

As shown in FIG. 3B, a doping process is performed by covering a part of the polycrystalline silicon thin film pattern 124 by a photoresist, thereby forming a storage pattern 124". The polycrystalline silicon thin film 124 covered by the photoresist forms an active pattern 124', such that an additional photolithography process (a second mask process) is required.

Figure 3C:
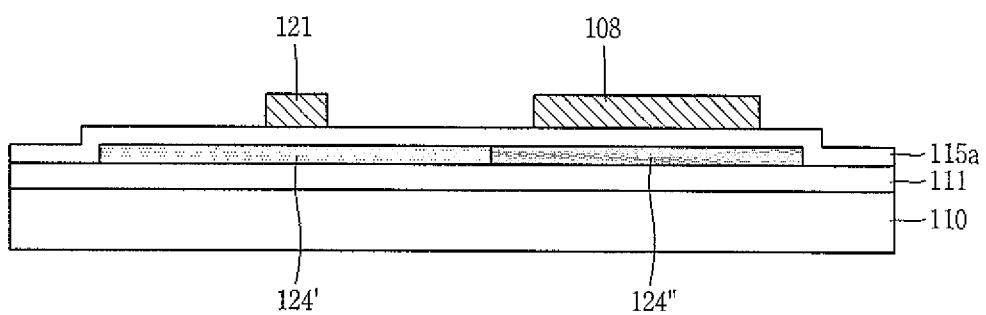

As shown in FIG. 3C, a first insulating film 115a and a first conductive layer (not shown) are sequentially formed on an entire surface of the substrate 110. Then, the first conductive layer is selectively patterned by using a photolithography process (a third mask process), thereby forming a gate electrode 121 consisting of the first conductive layer on the active pattern 124' and forming a common line 108 consisting of the first conductive layer on the storage pattern 124". The first conductive layer to constitute the gate electrode 121 and the common line 108 is formed of an opaque conductive material having a low resistance, such as aluminum (Al), aluminum alloy (Al alloy), tungsten (W), copper (Cu), chromium (Cr), and molybdenum (Mo). The common line 108 overlaps with the storage pattern 124" therebelow in the pixel portion to form the first storage capacitor by interposing the first insulating film 115a.

Figure 3D:
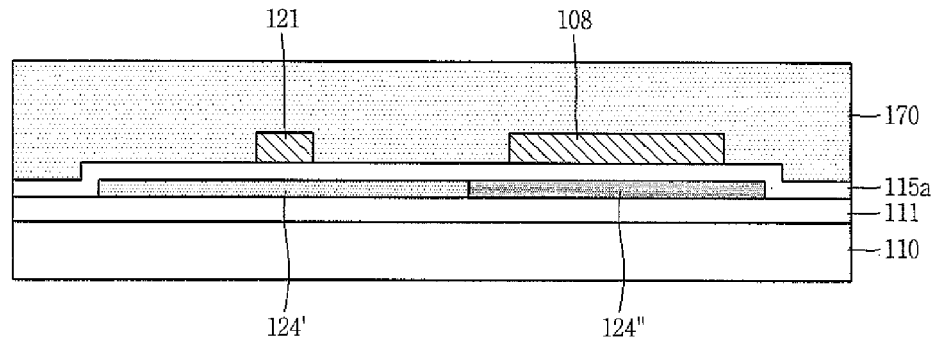

As shown in FIG. 3D, a first blocking film 170 of a photoresist is formed on the substrate having the first gate electrode 121 and the common line 108. The pixel portion of the array substrate 110 and the n-channel TFT region of the circuit portion are entirely covered by a first blocking film 170 formed of a photoresist (a fourth mask process). The p-channel TFT region is partially covered by the first blocking film 170, and a heavily doped p+ ion is implanted into the p-channel TFT region of the circuit portion to form a p+ source region and a p+ drain region using the first blocking film 170 as a mask. As FIG. 3D shows only the pixel portion including the n-channel TFT region and not the p-channel TFT region, the formation of a p+ source region and a p+ drain region in the p-channel TFT region of the circuit portion which is partially covered by the first blocking film 170 is not shown in FIG. 3D. A visual demonstration of the formation of source and drain regions can be seen in the following paragraph regarding the formation of a n+ source region and a n+ drain region in the n-channel TFT region.

Figure 3E:
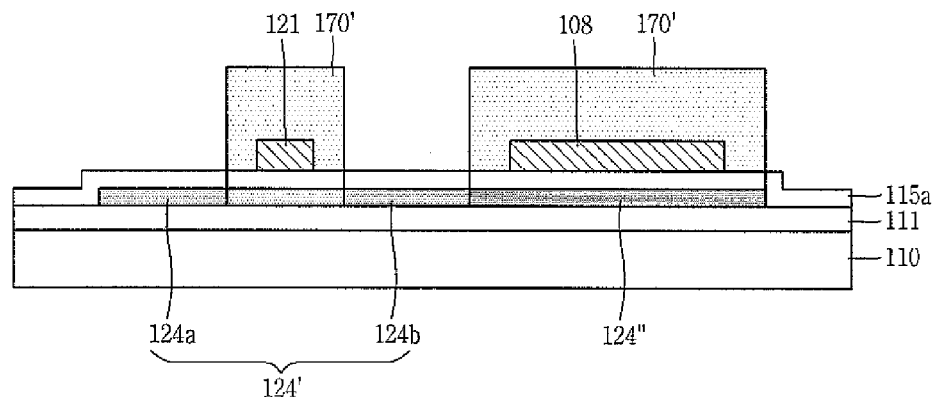

As shown in FIG. 3E, the first blocking film is removed. Subsequently, a second blocking film 170' is formed on the substrate having the p+ source and drain regions. The entire p-channel TFT region of the circuit portion, a portion of the n-channel TFT region of the circuit portion, and the storage region are covered by a second blocking film 170' (a fifth mask process). To form a source region and a drain region in the n channel TFT region, heavily doped n+ ions are implanted into the active pattern 124' of the pixel portion, thereby forming an n+ source region 124a and an n+ drain region 124b. The reference numeral 124c denotes a channel region for forming a conductive channel between the source region 124a and the drain region 124b. Thereafter, the second blocking film 170' is removed. Then, lightly doped n− ions are implanted into the entire surface of the substrate 110 to form a lightly doped drain (LDD) region 124l between the n+ source and drain regions 124a and 124b and the channel region 124c. At this time, the storage region may be covered or not covered by the second blocking film 170'. Likewise, as previously mentioned, p+ ions are implanted to the p channel TFT region of the circuit portion to form p+ source and drain regions, and p− ions are implanted to form LDD regions.

Figure 3F:
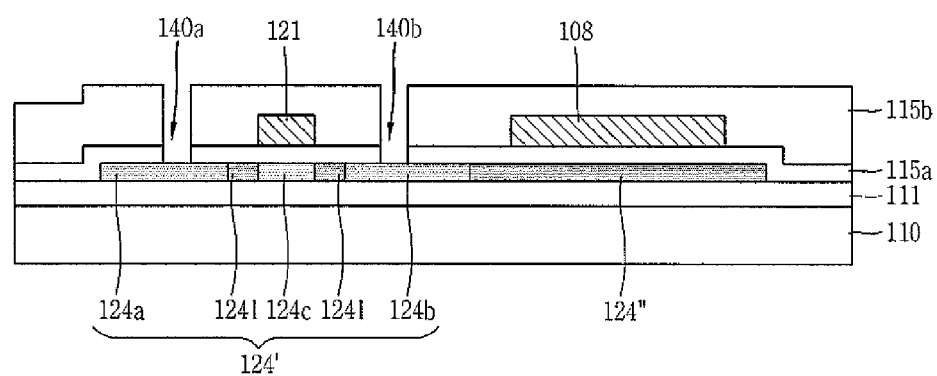

As shown in FIG. 3F, a second insulating film 115b is deposited on the entire surface of the substrate 110. Then, the first insulating film 115a and the second insulating film 115b are partially removed by a photolithography process (a sixth mask process). As a result, a first contact hole 140a and a second contact hole 140b for partially exposing the source region 124a and the drain region 124b are formed. In other words, the second blocking film 170' is removed, and then, although not shown, while the LDD region 124l is formed in the n channel TFT region of the pixel portion, a lightly doped n− ion is implanted into the entire surface of the substrate 110 from which the second blocking film is removed, so as to form a lightly doped drain (LDD) region 124l.

Figure 3G:
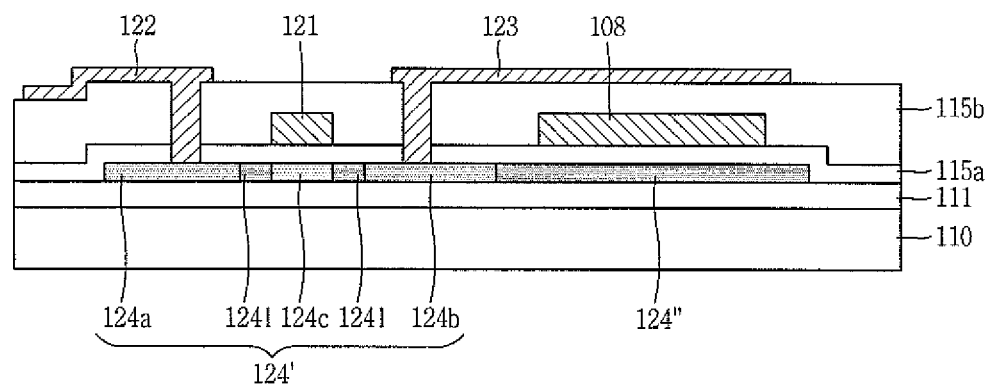

As shown in FIG. 3G, the second conductive layer (not shown) is formed on the entire surface of the substrate 110. Then, it is selectively patterned using a photolithography (a seventh mask process). As the result, a source electrode 122 electrically connected to the source region 124a through the first contact hole 140a is formed, and a drain electrode 123 electrically connected to the drain region 124b through the second contact hole 140b is formed. Herein, a part of the source electrode 122 extends in one direction constituting the data line 117. In addition, a part of the drain electrode 123 extends towards the pixel portion overlapping with the common line 108 formed therebelow with the second insulating film 115b being interposed therebetween, thereby constituting a second storage capacitor.

Figure 3H:
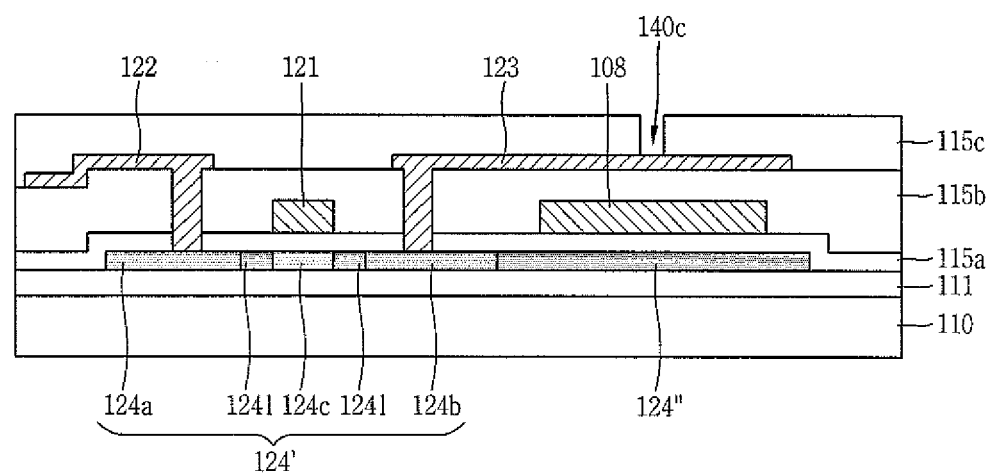

As shown in FIG. 3H, a third insulating film 115c is deposited on the entire surface of the substrate 110. Then, it is selectively patterned by using a photolithography process (an eighth mask process), thereby forming a third contact hole 140c for partially exposing the drain electrode 123.

Figure 3I:
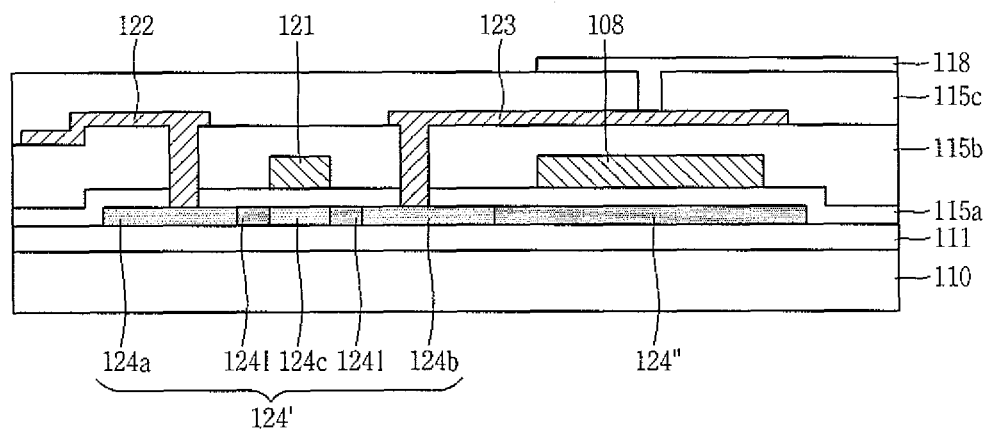

As shown in FIG. 3I, a third conductive layer (not shown) is deposited on the entire surface of the substrate 110 where the third insulating film 115c is formed. Then, it is selectively patterned by using a photolithography process (a ninth mask process), thereby forming a pixel electrode 118 electrically connected to the drain electrode 123 through the third contact hole 140c. The third conductive layer to constitute the pixel electrode 118 can be formed of a transparent conductive material having a high transmittance, such as indium-tin-oxide (ITO) or indium-zinc-oxide (IZO).

In the array substrate according to the first embodiment of the present invention, the active pattern and the storage pattern are formed of the polycrystalline silicon thin film, and a storage doping is performed on the storage pattern through a separate mask process. Accordingly, the TFT of the pixel portion and the circuit portion can be fabricated through nine mask processes.

Figure 4:
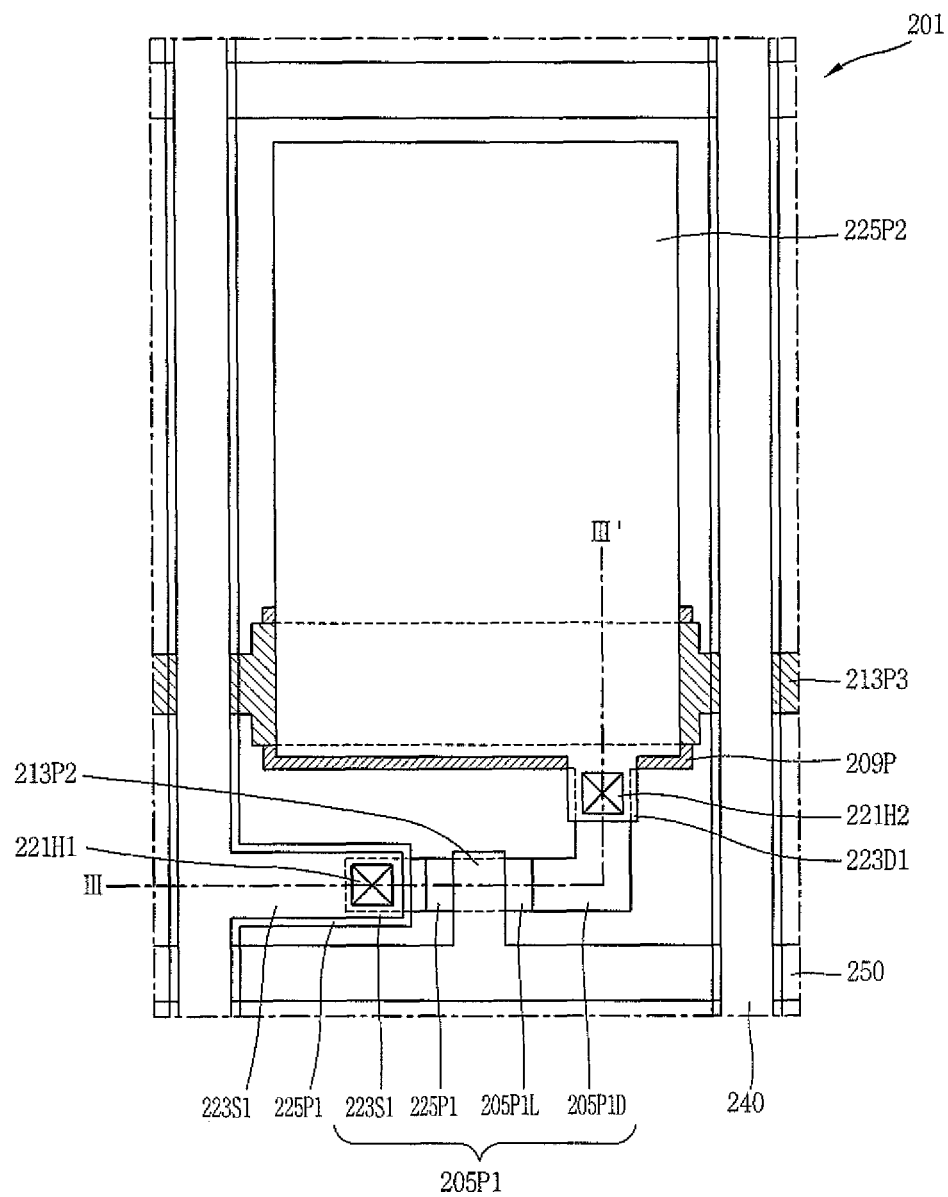
FIG. 4 is a plane view illustrating a part of an array substrate of an LCD according to the second exemplary embodiment of the present invention.

FIG. 4 is a plane view illustrating a part of an array substrate of an LCD according to the second embodiment of the present invention. As shown in FIG. 4, an insulating substrate 201 according to the second embodiment of the present invention includes gate and data lines 250 and 240 arranged to define pixel regions in vertical and horizontal directions. The insulating substrate 201 corresponds to an array substrate. A thin film transistor serving as a switching device is formed in a portion where the gate line 250 crosses the data line 240, and a drain electrode pattern 225P2 of a pixel portion, which is a pixel electrode, is formed in the pixel region and connected with the thin film transistor to drive a liquid crystal (not shown) along with a common electrode (not shown) of a color filter substrate (not shown).

The thin film transistor includes a gate electrode 213P2 of the pixel portion and source and drain electrodes 223S1 and 223D1 of the pixel electrode, wherein the gate electrode 213P2 is connected with the gate line 250, and the source and drain electrodes 223S1 and 223D1 are connected with the data line 240. The thin film transistor further includes a first active layer 205P1 that forms a conductive channel between the source electrode 223S1 and the drain electrode 223D1 using a gate voltage supplied to the gate electrode 213P2.

The first active layer 205P1 is divided into a source region 205P1S of the pixel region and a drain region 205P1D of the pixel region. A part of the first active layer 2305P1 is extended to the pixel region, and a storage electrode 209P is formed above the extended first active layer 205P1. The storage electrode 209P may be patterned using n+ silicon layer or a metal film. An insulating film (not shown) may be interposed between the first active layer 205P1 and the storage electrode 209P.

A common line 213P3 is formed in the pixel region in a direction substantially same as that of the gate line 250. The common line 213P3 overlaps the storage electrode 209P by interposing a gate insulating film (not shown) therebetween to constitute a storage capacitor. The common line 213P3 may be patterned using the same film as that of the gate electrode 213P2. If an insulating film is interposed between the active layer 205P1 and the storage electrode 209P, the insulating film may be a first gate insulating film, and the gate insulating film may be a second gate insulating film.

A passivation film (not shown) is arranged to cover the substrate having the common line 213P3. A first contact hole 221H1 and a second contact hole 221H2 are formed in the passivation film and the gate insulating film, wherein the first contact hole 221H1 exposes the source region 205P1S while the second contact hole 221H2 exposes the drain region 205P1D. The source electrode 223S1 and the drain electrode 223D1 are electrically connected with source and drain regions 205P1S and 205P1D of the first active layer 205P1 through the first contact hole 221H1 and the second contact hole 221H2, respectively.

The drain electrode pattern 225P2 covers the drain electrode 223D1 and is partially extended to the pixel region. The drain electrode pattern 225P2 may be the pixel electrode. A source electrode pattern 225P1 of the pixel portion is formed on the source electrode 223S1 of the pixel portion. The drain electrode pattern 225P2 and the source electrode pattern 225P1 may be patterned using the same film.

FIGS. 5A to 5F are sectional views, taken along line III-III' of FIG. 4, illustrating process steps of a method for fabricating an LCD according to the second exemplary embodiment of the present invention.

As shown in FIG. 5A, an insulating substrate 201 is initially prepared including a pixel portion and a circuit portion. The pixel portion in the insulating substrate 201 is divided into an n channel (or p channel) thin film transistor region and a storage region. The circuit portion is divided into an n channel thin film transistor region and a p channel thin film transistor region. In other words, the n channel thin film transistor region or the p channel thin film transistor region may be formed in the pixel portion, while the n channel thin film transistor region and the p channel thin film transistor region are formed in the circuit portion to constitute a CMOS structure. The insulating substrate 201 may be an array substrate. The insulating substrate 201 may be formed of a transparent insulating substrate, such as glass. Next, a buffer layer 203, a polycrystalline silicon film 205, an insulating film 207, and a storage electrode film 209 are sequentially formed on the insulating substrate 201. Depending on the region, i.e., the thin film transistor region or the storage region, the insulating film 207 may be a gate insulating film. In addition, the insulating film 207 may be formed of a silicon oxide film ($SiO_2$) or the insulating film 207 may even be omitted. The storage electrode film 209 may be formed of an n+ silicon film or a conductive layer.

As shown in FIG. 5B, a first blocking film 230 is formed next on the storage electrode film 209 using a slit or a half tone mask (not shown). The first blocking film 230 may be a photoresist pattern having different thicknesses. In particular, the first blocking film 230 may be formed such that the thickness in the storage region is relatively thicker than that in the thin firm transistor region. The storage electrode film, the insulating film and the polycrystalline silicon film are selectively etched using the first blocking film 230 to form a pixel pattern 210P1 and first and second circuit patterns 210P2 and 210P3, wherein the pixel pattern 210P1 covers the pixel portion, and the first and second circuit patterns 210P2 and 210P3 respectively cover the n channel thin film transistor region and the p channel thin film transistor region of the circuit portion.

As shown in FIG. 5C, a first blocking film 230P is formed by ashing the first blocking film 230. The first blocking film is removed in the n channel thin film transistor region and the p channel thin film transistor region of the circuit portion and the thin film transistor region of the pixel portion, which are relatively thin, while the first blocking film selectively remains in the storage region of the pixel portion. Subsequently, the storage electrode film and the insulating film are selectively removed from the pixel pattern 210P1 and the first and second circuit patterns 210P2 and 210P3 exposed by the remaining first blocking film 230P. At this time, first, second and third active layers 205P1, 205P2 and 205P3 of polycrystalline silicon are formed in the n channel thin film transistor region of the pixel portion, the n channel thin film transistor region of the circuit portion, and the p channel thin film transistor region of the circuit portion.

As shown in FIG. 5D, the remaining first blocking film is removed. A gate insulating film 211, a first metal film 213 and a second blocking film 233 are sequentially formed on the substrate having the first, second and third active layers 205P1, 205P2 and 205P3. If the insulating film 207 is interposed between the polycrystalline silicon film 205 and the storage electrode film 209 as shown in FIG. 5A, the insulating film may be a first gate insulating film and the gate insulating film 211 may be a second gate insulating film. If the gate insulating film has a double structure of the first gate insulating film and the second gate insulating film as above, the total thickness of the gate insulating film having the double structure corresponds to a value obtained by adding a thickness of the first gate insulating film to a thickness of the second gate insulating film. Accordingly, the gate insulating film having the double structure according to the present invention is formed at the same thickness as the existing thickness by properly controlling the thickness of the first gate insulating film and the thickness of the second gate insulating film.

The second blocking film 233 is patterned to selectively cover the pixel portion, the n channel thin film transistor region of the circuit portion, a portion where a p channel gate electrode of the p channel thin film transistor region will be formed. In other words, the second blocking film 233 is patterned to selectively expose only a portion of the p channel thin film transistor region of the circuit portion, where the source and drain regions will be formed. Subsequently, the first metal film is etched using the second blocking film 233 to form a first gate electrode 213P1 of the circuit portion in the p channel thin film transistor region of the circuit portion. Since the pixel portion and the n channel thin film transistor region of the circuit portion are masked by the second blocking film 233, the first metal film remains without being patterned. Then, p+ doping is performed for the substrate having the first gate electrode 213P1 of the circuit portion using the second blocking film 233. As a result, first source and drain regions 205P3S and 205P3D of the circuit portion are formed in the third active layer 205P3.

Figure 5E:
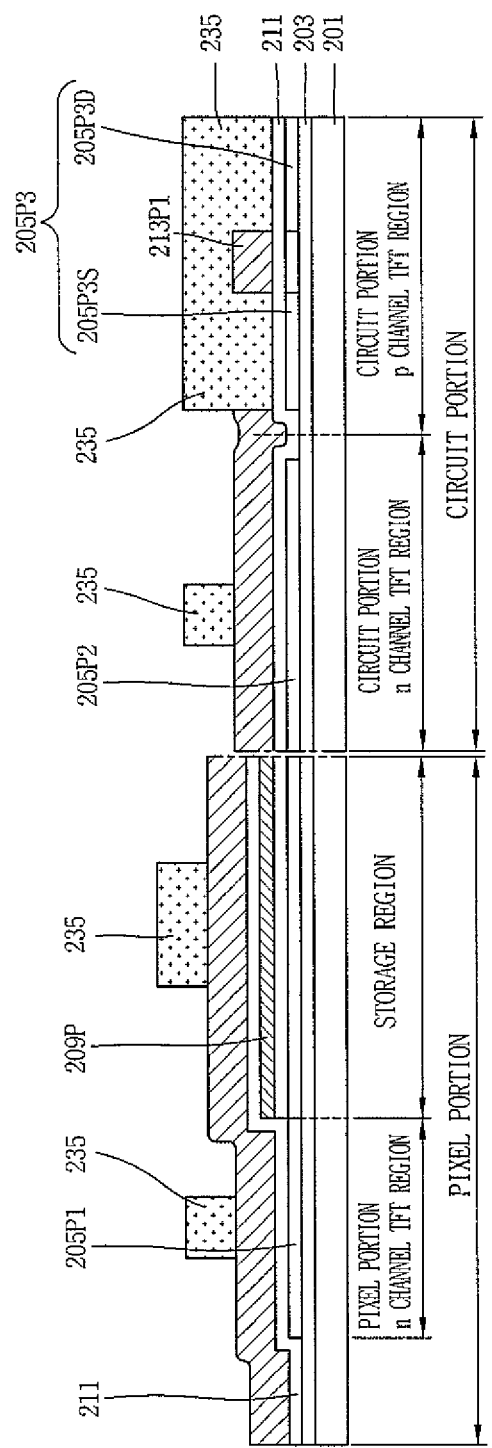

As shown in FIG. 5E, the second blocking film is removed. A third blocking film 235 is formed on the entire surface of the substrate having the first gate electrode 213P of the circuit portion. The third blocking film 235 is patterned to cover a portion of the pixel portion, where a gate electrode and a common line will be formed, and a portion of the circuit portion, where a second gate electrode will be formed in the n channel thin film transistor region, and the p channel thin film transistor region.

Figure 5F:
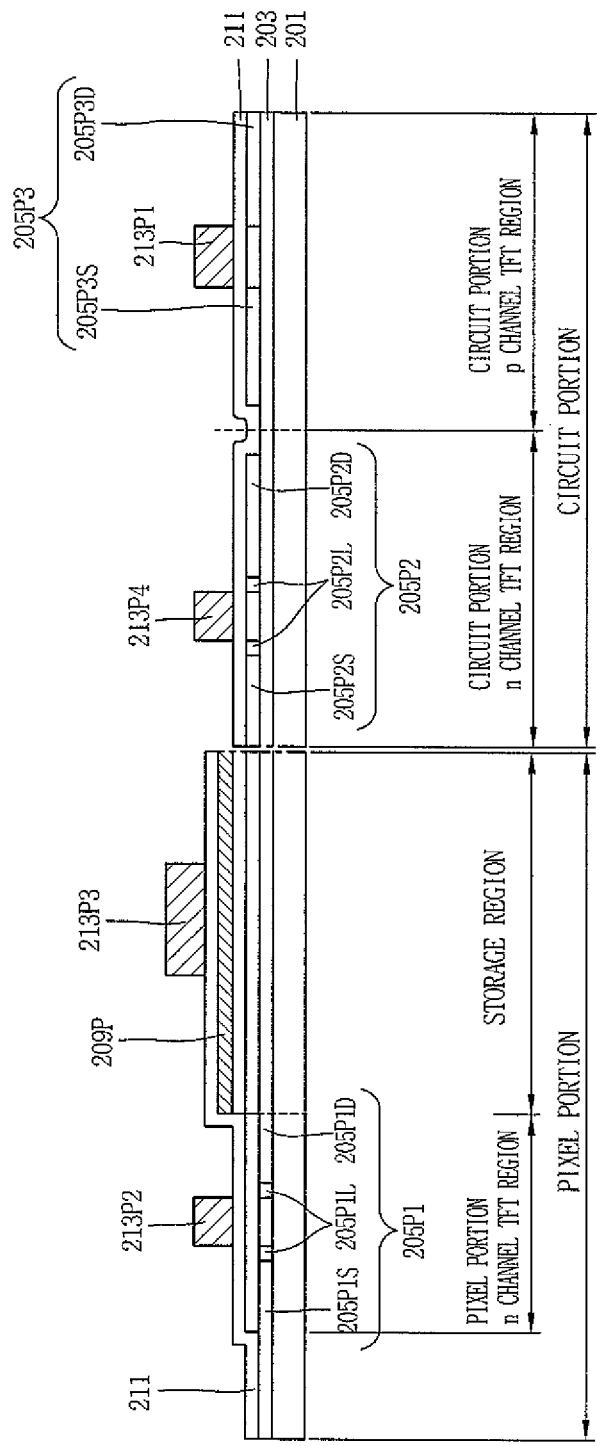

As shown in FIG. 5F, the remaining first metal film is etched using the third blocking film to form the gate electrode 213P2 and the common line 213P3 in the pixel portion, and at the same time to form the second gate electrode 213P4 in the n channel thin film transistor region of the circuit portion. The remaining first metal film may be etched by wet etching. As a result, the gate electrode 213P2, the common line 213P3 and the second gate electrode 213P4 may excessively be etched in a lateral direction. Subsequently, n+ ion doping is performed for the substrate having the third blocking film. As a result, the source region 205P1S and the drain region 205P1D are formed in the n channel thin film transistor region of the pixel portion, and the second source region 205P2S and the second drain region 205P2D are formed in the n channel thin film transistor region of the circuit portion. In other words, the source region 205P1S and the drain region 205P1D are formed in the first active layer 205P1 below both sides of the gate electrode 213P2 of the pixel portion. Also, the second source region 205P2S and the second drain region 205P2D are formed in the second active layer 205P2 below both sides of the gate electrode 213P4 of the circuit portion.

Afterwards, the third blocking film is removed, and then LDD doping (n−) is performed for the entire surface of the substrate using the gate electrode 213P2 and the second gate electrode 213P4 as masks. As a result, a first LDD region 205P1L is formed in the n channel thin film transistor region of the pixel portion while a second LDD region 205P2L is formed in the n channel thin film transistor region of the circuit portion. The first and second LDD regions 205P1L and 205P2L are formed as much as wet CD bias, and can be obtained by doping for the entire surface of the substrate in a state that there is no separate mask. The remaining third blocking film is removed.

Figure 5G:
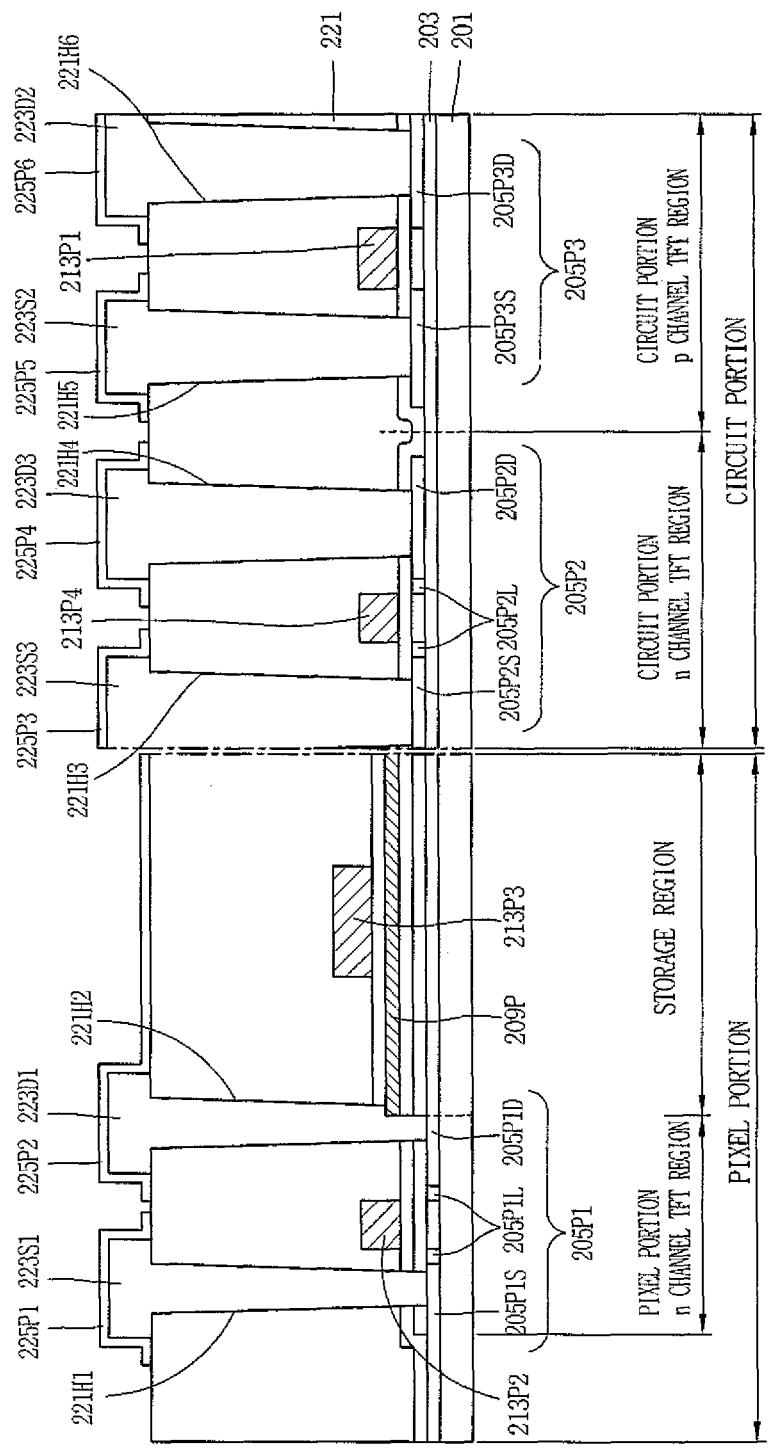

As shown in FIG. 5G, a passivation film 221 is formed on the substrate having the first and second LDD regions 205P1L and 205P2L. A silicon oxide film ($SiO_2$) and a silicon nitride film (SiNx) deposited in due order may be used as the passivation film 221. At this time, the passivation film 221 is formed in such a manner that after the silicon oxide film is deposited and undergoes activation annealing, the silicon nitride film is deposited and undergoes hydrogenation annealing (first method). Alternatively, the passivation film 221 is formed in such a manner that the silicon oxide film and the silicon nitride film are sequentially formed and then annealed (second method). If the passivation film 221 is formed by the second method, activation of the silicon oxide film and hydrogenation of the silicon nitride film can be performed simultaneously through annealing of one time.

A single silicon nitride film may be used as the passivation film 221. As described above, the present invention adopts the silicon nitride film as the passivation film 221. In this case, the silicon nitride film serves as a hydrogen source that can act on hydrogenation. However, if a structure of a silicon oxide film ($SiO_2$)/silicon nitride film (SiNx) or a structure of a single silicon nitride film (SiNx) is adopted as the passivation film as described above, the silicon nitride film has a dielectric constant of 6.5 to 7.0 and has greater capacitance per unit area with the same deposition thickness than that of the silicon oxide film having a dielectric constant of 3.9. Accordingly, electric effect increases between the gate and data lines respectively arranged above and below the passivation film and thus signal delay increases, whereby a problem may occur in view of high speed operation and high resolution.

To solve such a problem, the passivation film 221 may be formed in a triple structure of silicon oxide film ($SiO_2$)/silicon nitride film (SiNx)/silicon oxide film ($SiO_2$), wherein the silicon oxide film having a low dielectric constant is deposited on the silicon nitride film. If the triple structure of silicon oxide film ($SiO_2$)/silicon nitride film (SiNx)/silicon oxide film ($SiO_2$) is adopted as the passivation film 221, capacitance per unit area with respect to the same deposition thickness can be smaller than that of the structure of silicon oxide film ($SiO_2$)/silicon nitride film (SiNx) or the structure of silicon nitride film (SiNx). As a result, electric effect decreases between the gate and data lines and thus signal delay decreases, whereby high speed operation or high resolution can be realized.

Next, the passivation film and the gate insulating film are etched using a separate mask (not shown) to form first, second, third, fourth, fifth and sixth contact holes 221H1, 221H2, 221H3, 221H4, 221H5, and 221H6. The first contact hole 221H1 and the second contact hole 221H2 expose the source region 205P1S and the drain region 205P1D of the pixel portion. In this case, the second contact hole 221H2 is patterned to expose a part of the storage electrode 209P as well as the drain region 205P1D of the pixel portion. The third contact hole 221H3 and the fourth contact hole 221H4 expose the second source region 205P2S and the second drain region 205P2D of the circuit portion. The fifth contact hole 221H5 and the sixth contact hole 221H6 expose the first source region 205P3S and the first drain region 205P3D of the circuit portion.

Subsequently, a second metal film is formed on the substrate having the contact holes. The second metal film is then patterned to form the source electrode 223S1 and the drain electrode 223D1 in the n channel thin film transistor region of the pixel portion, wherein the source electrode 223S1 and the drain electrode 223D1 respectively cover the first contact hole 221H1 and the second contact hole 221H2. While the source electrode 223S1 and the drain electrode 223D1 are formed, the second source electrode 223S3 and the second drain electrode 223D3 are also formed in the n channel thin film transistor region of the circuit portion, wherein the second source electrode 223S3 and the second drain electrode 223D3 respectively cover the third contact hole 221H3 and the fourth contact hole 221H4. Also, the first source electrode 223S2 and the first drain electrode 223D2 are formed in the p channel thin film transistor region of the circuit portion, wherein the second source electrode 223S2 and the second drain electrode 223D2 respectively cover the fifth contact hole 221H5 and the sixth contact hole 221H6.

Subsequently, a transparent conductive film is formed on the substrate having the source electrodes 223S1, 223S2 and 223S3 and the drain electrodes 223D1, 223D2 and 223D3. The transparent conductive film is then patterned to form the source electrode pattern 225P1 and the drain electrode pattern 225P2 of the pixel portion, which respectively cover the source electrode 223S1 and the drain electrode 223D1 of the pixel portion. In this case, the drain electrode pattern 225P2 of the pixel portion covers the drain electrode 223D1 of the pixel portion and is patterned to be extended to the pixel region. The drain electrode pattern 225P2 of the pixel portion may be the pixel electrode. Simultaneously, the first and second source electrode patterns 225P5 and 225P3 and the first and second drain electrode patterns 225P6 and 225P4 are also formed in the p channel thin film transistor region and the n channel thin film transistor region of the circuit portion, wherein the first and second source electrode patterns 225P5 and 225P3 cover the first and second source electrodes 223S2 and 223S3, and the first and second drain electrode patterns 225P6 and 225P4 cover the first and second drain electrodes 223D2 and 223D3.

As described above, in the second exemplary embodiment of the present invention, the active layer and the storage electrode are formed by diffraction exposure using a first mask process, and the gate electrode 213P1 is formed in the P channel TFT region using a second mask process. In addition, the N channel gate electrode 213P1 and the common line 213P2 are formed in the pixel portion using a third mask process, and the contact holes are formed in the passivation film 221 using a fourth mask process. Finally, the source and drain electrodes, 223S and 225D, are formed using a fifth mask process, and the source electrode pattern 225P1 and the drain electrode pattern 225P2 are formed using a sixth mask process. Accordingly, a CMOS structure of six masks can be realized at a high aperture ratio.

The LCD and the method for fabricating the same according to the present invention have the following advantages. The active layer and the storage electrode are formed using a single mask by the diffraction exposure process. As the number of the masks used for fabrication of the TFT is reduced, the fabricating process steps and the fabricating cost can be reduced correspondingly. In addition, since the storage electrode is formed by interposing the insulating film over the active layer, damage of the active layer can be prevented thus leading to improved electrical characteristics of the TFT. In addition, luminance can be increased due to an improvement in the aperture ratio.

It will be apparent to those skilled in the art that various modifications and variations can be made in the a liquid crystal display and a method for fabricating the same of the present invention without departing form the spirit or scope of the invention. Thus, it is intended that the present invention cover the modifications and variations of this invention provided they come within the scope of the appended claims and their equivalents.

What is claimed is:

1. A liquid crystal display, comprising:
an insulating substrate including a pixel portion divided into a thin film transistor region and a storage region;
an active layer pattern formed on the thin film transistor region;
a storage pattern formed on the storage region of the substrate;
a gate insulating film formed on the active layer pattern of the thin film transistor region and the storage pattern of the storage region;
a gate electrode formed on the gate insulating film of the transistor region;
a storage electrode formed on the gate insulating film to selectively cover the storage region;
a common line formed on the substrate including the storage electrode;
source and drain regions of the pixel portion in the active layer pattern below both sides of the gate electrode of the pixel portion;
a passivation film on the substrate including the source region and the drain region of the pixel portion;
first and second contact holes in the passivation film respectively exposing the source region and the drain region of the pixel portion;
a source electrode of the pixel portion filling the first contact hole on the passivation film and connected with the source region of the pixel portion; and
a drain electrode of the pixel portion filling the second contact hole on the passivation film and connected with the drain region of the pixel portion,
wherein the second contact hole simultaneously exposes a portion of the drain region of the pixel portion and a portion of the storage electrode.

2. The liquid crystal display according to claim 1, wherein the active layer pattern includes a polycrystalline silicon film.

3. The liquid crystal display according to claim 1, wherein the storage electrode includes an N+ silicon film.

4. The liquid crystal display according to claim 1, wherein the storage electrode includes a metal film.

5. The liquid crystal display according to claim 1, further comprising a buffer layer interposed between the insulating substrate and the active layer pattern.

6. The liquid crystal display according to claim 1, further comprising an insulating film interposed between the storage electrode and the common line.

7. The liquid crystal display according to claim 6, wherein the insulating film includes a silicon oxide ($SiO_2$) film.

8. The liquid crystal display according to claim 1, wherein the passivation film includes at least one of a single silicon nitride film ($SiN_x$), a layer of silicon oxide film ($SiO_2$)/silicon nitride film ($SiN_x$), and a layer of silicon oxide film ($SiO_2$)/silicon nitride film ($SiN_x$)/silicon oxide film ($SiO_2$).

9. A liquid crystal display, comprising:
an insulating substrate including a pixel portion and a circuit portion, the pixel portion being divided into a thin film transistor region and a storage region, and the circuit portion being divided into an n-channel thin film transistor region and a p-channel thin film transistor region;
a first active layer pattern covering the thin film transistor region and the storage region of the pixel portion, a second active layer pattern covering the n-channel thin film transistor region of the circuit portion, and a third active layer pattern covering the p-channel thin film transistor region of the circuit portion, the first, second, and third active layer patterns being formed on the insulating substrate at the same level;
a storage electrode on the substrate including the first active layer pattern to cover the storage region of the pixel portion;
a gate insulating film formed on the first, second, and third active layer patterns of the pixel and the circuit portion;
a gate electrode of the pixel portion and first and second gate electrodes of the circuit portion respectively on the gate insulating film of the first, third and second active layer patterns;
a source region of the pixel portion and a drain region in the first active layer pattern below both sides of the gate electrode of the pixel portion;
second source and drain regions of the circuit portion in the second active layer pattern below both sides of the second gate electrode of the circuit portion;
first source and drain regions of the circuit portion in the third active layer pattern below both sides of the first gate electrode of the circuit portion;
a passivation film formed on the substrate including the first source and drain regions of the circuit portion;
first, second, third, fourth, fifth, and sixth contact holes respectively exposing the source region of the pixel portion and the drain region, the second source and drain regions of the circuit portion, and the first source and drain regions of the circuit portion;
a source electrode of the pixel portion, a second source electrode of the circuit portion, and a first source electrode of the circuit portion respectively connected with the source region of the pixel portion, the second source region of the circuit portion, and the first source region of the circuit portion filling the first, third, and fifth contact holes on the passivation film; and
a drain electrode of the pixel portion, a second drain electrode of the circuit portion, and a first drain electrode of the circuit portion respectively connected with the drain region of the pixel portion, the second drain region of the circuit portion and the first drain region of the circuit portion by filling the second, fourth, and sixth contact holes on the passivation film,
wherein the second contact hole simultaneously exposes a portion of the drain region of the pixel portion and a portion of the storage electrode.

10. The liquid crystal display according to claim 9, further comprising an insulating film interposed between the storage electrode and a common line on the substrate.

* * * * *